United States Patent [19]

Christ et al.

[11] 4,282,639
[45] Aug. 11, 1981

[54] HEATED CONTROLLED DEFLECTION ROLL

[75] Inventors: Alfred Christ, Zurich; Rolf Lehmann, Rudolfstetten, both of Switzerland

[73] Assignee: Escher Wyss Limited, Zurich, Switzerland

[21] Appl. No.: 107,135

[22] Filed: Dec. 26, 1979

[30] Foreign Application Priority Data

Jan. 23, 1979 [CH] Switzerland .................... 640/79

[51] Int. Cl.³ .............................................. B21B 13/02
[52] U.S. Cl. ............................ 29/116 AD; 100/162 B
[58] Field of Search ................... 29/113 AD, 116 AD; 100/162 B, 170, 185

[56] References Cited

U.S. PATENT DOCUMENTS

| | | | |
|---|---|---|---|
| 3,726,338 | 4/1973 | Sorenson | 29/116 AD X |
| 3,932,921 | 1/1976 | Biondetti | 29/116 AD X |
| 3,994,367 | 11/1976 | Christ | 29/116 AD X |
| 4,023,480 | 5/1977 | Biondetti | 100/162 B |
| 4,106,405 | 8/1978 | Biondetti et al. | 100/162 B |
| 4,223,011 | 11/1980 | Bolender et al. | 29/116 AD |

*Primary Examiner*—Wayne L. Shedd
*Attorney, Agent, or Firm*—Werner W. Kleeman

[57] ABSTRACT

A controlled deflection roll is disclosed comprising a stationary support and a rotatable hydraulically supported roll shell. There is also provided heating of the hydraulic liquid which is infed to the controlled deflection roll by a pump device. The pressure line of the pump device is connected by means of a heat exchanger with a return flow line. Connected after the heat exchanger is a cooling device having a temperature regulator. In the pressure line there is arranged following the heat exchanger a heating device. The return flow line is connected by means of an overflow valve with a container for hydraulic medium which is fed to a heating device for the controlled deflection roll.

10 Claims, 5 Drawing Figures

HEATED CONTROLLED DEFLECTION ROLL

CROSS-REFERENCE TO RELATED CASE

This application is related to our commonly assigned, copending United States application Ser. No. 06,107,134 filed Dec. 26, 1979, and entitled "CONTROLLED DEFLECTION ROLL".

BACKGROUND OF THE INVENTION

The present invention relates to a new and improved construction of a heated controlled deflection roll comprising a stationary support and a roll shell mounted to be rotatable about such stationary support. Further, there is provided at least one pressure or support element serving for supporting the roll shell and which is connected with the pressure line of a pump device for infeeding hydraulic pressurized fluid medium, which, in turn, is connected with a return flow line for the medium.

Such type controlled deflection roll—also known in the art as roll with bending or sag compensation—is known, for instance, from Swiss Pat. No. 577,598. In accordance with the teachings of this prior art patent the heated hydraulic medium, for instance oil, is pressurized by a pump so that it has the requisite pressure, and thereafter is delivered to the pressure or support element or a number of pressure or support elements. Such type device is however only suitable for use with low pressures or temperatures. At higher pressures and temperatures it is difficult, with the pumps which are available, to bring the hot oil, having a temperature up to 300° C. and more, to the desired pressure.

SUMMARY OF THE INVENTION

Therefore, with the foregoing in mind, it is a primary object of the present invention to provide a new and improved construction of controlled deflection roll which is not afflicted with the aforementioned drawbacks and limitations of the prior art discussed above.

Another and more specific object of the present invention aims at providing an apparatus by means of which the aforementioned difficulties can be eliminated and there is possible an economical operation of heated controlled deflection rolls, even at higher temperatures of the hydraulic fluid medium.

Still a further significant object of the present invention aims at providing a new and improved construction of a heated controlled deflection roll arrangement which is relatively simple in design, economical to manufacture, and enables operation of the controlled deflection roll at greater temperatures and pressures of the fluid medium than heretofore possible.

Now in order to implement these and still further objects of the invention which will become more readily apparent as the description proceeds, the heated controlled deflection roll arrangement of the present development is manifested by the features that there is provided a heat exchanger interconnecting the return flow line with the pressure line and for transferring heat from the return flow line to the pressure line. In the return flow line there is arranged following the heat exchanger a cooling device which is equipped with a temperature regulator.

Due to the combination of such type heat exchanger with the cooling device the oil which is infed through the return flow line to the pump is cooled, while at the same time the oil conveyed by the pump is heated. Due to this heat exchange action it is beneficially possible to reduce the temperature of the oil infed to the pump, with minimum thermal losses, to a value which is suitable for proper operation of the pump.

Preferably, the heat exchanger can operate according to the counterflow principle, and in this way the thermal losses are still further reduced.

There can be arranged in the pressure line, after the heat exchanger, a heating device. In this way it is possible to additionally maintain the temperature of the pressurized fluid medium emanating from the heat exchanger at a desired upper value.

If there is provided in the controlled deflection roll a heating device to which there is infed a hydraulic fluid medium from a container for the purpose of heating the controlled deflection roll, then the return flow line can be connected by means of an overflow valve or equivalent structure with the container. The overflow valve, in this case, separates two flow or circulation systems for the same pressurized fluid medium, namely the circulation system or flow path through the pressure element or pressure elements, as the case may be, and the circulation system leading through the heating device.

Although the inventive measures can be successfully employed in conjunction with hydraulically activatable controlled deflection rolls of the most different constructions, most of the advantages which can be obtained are realized in conjunction with a controlled deflection roll having a number of piston or punch-like pressure or support elements serving for the hydrostatic supporting and mounting of the roll shell. Such type controlled deflection roll is particularly suitable for working with high pressures of the pressurized fluid medium, so that there can be realized high pressure or compressure forces which are exerted by the controlled deflection roll while protecting the roll shell. On the other hand, the oil which effluxes from the hydrostatic bearing surfaces of the pressure or support elements decisively participates in the heat transfer to the roll shell.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
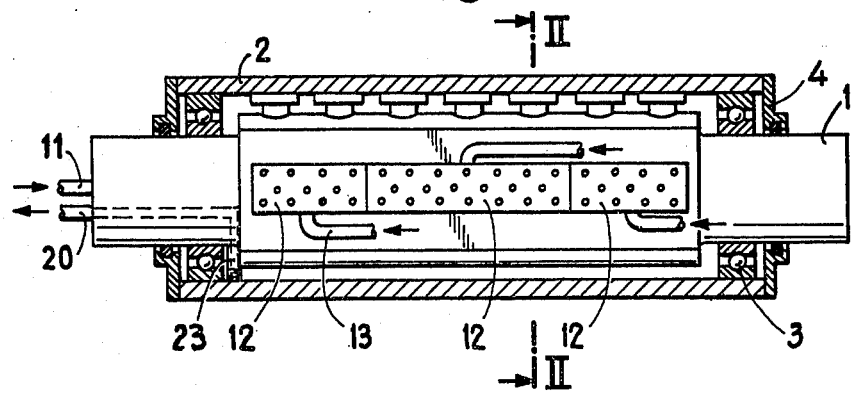
FIG. 1 is a schematic sectional view of a controlled deflection roll designed according to the invention.
Figure 2:
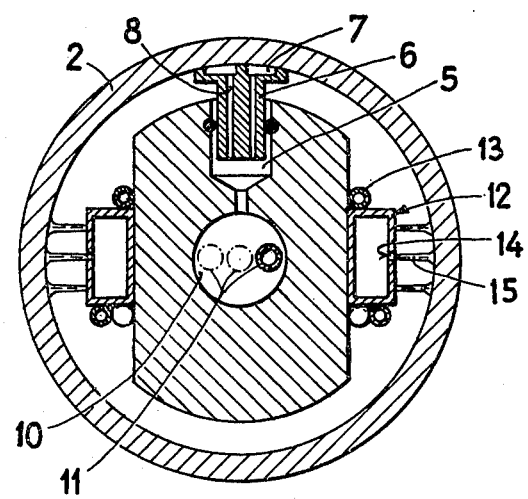
FIG. 2 is a cross-sectional view of the controlled deflection roll of FIG. 1, taken substantially along the line II—II thereof.

Describing now the drawings, the controlled deflection roll schematically illustrated in FIGS. 1 and 2 will be seen to comprise a stationary support or core 1 and a substantially tubular-shaped roll shell 2 which is rotatable about the stationary support 1. This roll shell 2, as best seen by referring to FIG. 1, is mounted upon the stationary support 1 in roller bearings 3 or equivalent structure. The ends of the roll shell 2 are closed by sealing disks 4 or the like. As best seen by referring to FIG. 2, bores 5 are formed in the stationary support 1 and within such bores there are sealingly guided hydrostatic pressure elements or support elements 6. The hydrostatic pressure elements are provided with bearing pockets 7 which flow communicate, by means of the throttle bores 8, with the internal chamber or space of the related cylindrical bore 5. These bearing pockets 7, under the action of the hydraulic pressurized fluid medium effective in the bores 5 and throttle bores 8, serve for the hydrostatic mounting or support of the roll shell 2 upon the pressure or support elements 6. Each of the cylindrical bores 5 is flow connected with a central bore 10 provided in the stationary support 1, this central bore 10 being connected with any suitable supply device for the infeed of a hydraulic pressurized fluid medium, typically for instance pressurized oil.

The pressure or support elements 6, shown in FIG. 1, can form a number of groups of pressure elements, to which there is infed the pressurized oil at different pressures so that there are formed different pressure forces. For this purpose there are arranged in the central bore 10 the tubes or pipes 11 leading to the individual groups of pressure or support elements 6.

A controlled deflection roll, such as has been illustrated in FIGS. 1 and 2, is in principle known from U.S. Pat. No. 3,802,044, to which reference may be readily had, since the function of the pressure or support elements has been explained in detail therein. On the other hand, a heated controlled deflection roll of this type is known from the aforementioned Swiss Pat. No. 577,598. A controlled deflection roll having a roll shell 2 which is movable in relation to the stationary support 1, where there can equally be employed the teachings of the invention, is known from U.S. Pat. No. 3,885,283.

Continuing, the controlled deflection roll shown in FIGS. 1 and 2 will be seen to be additionally provided with heating elements 12 having the form of boxes or casings connected at pipe lines or conduits 13 and at the stationary roll support 1. These heating elements 13 are provided with bores 14, through which, during operation, there efflux oil jets 15 which impact against and heat the inner wall of the roll shell 2. Details of such heating elements and related structure constitutes subject matter of our aforementioned U.S. application Ser. No. 06/107,134 filed Dec. 26, 1979, entitled "CONTROLLED DEFLECTION ROLL".

Figures 3, 5:
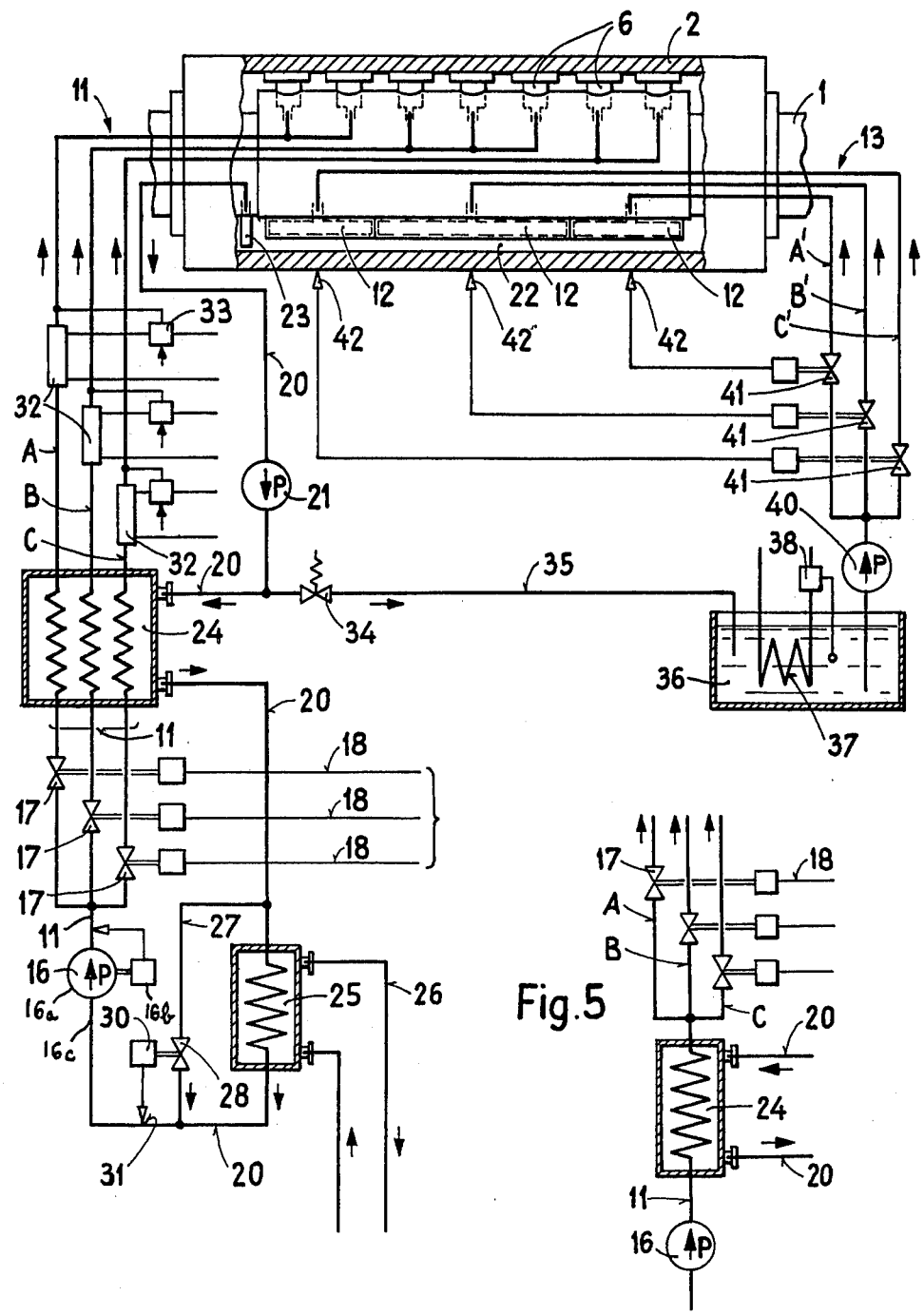
FIG. 3 is a schematic illustration of the controlled deflection roll showing the related circulation systems for heating and supporting of such roll.
FIG. 5 is a fragmentary sectional view of part of the hydraulic circuitry used in the arrangement of FIG. 3, showing a modification thereof.

Turning attention now to FIG. 3 there is schematically illustrated therein the controlled deflection roll together with the hydraulic circuitry for the heating circulation system leading to the pressure or support elements 6 and the heating circulation system leading to the heating elements or devices 12. As a matter of simplification and ease in understanding FIG. 3 the same reference characters employed in FIGS. 1 and 2 for the same or analogous elements have here again been used.

The controlled deflection roll of FIG. 3 will be seen to contain a pump device 16 embodying a pump 16a equipped with a pressure regulator 16b and serving for supplying the pressure or support elements 16 with hydraulic fluid medium at a suitable pressure. The pump device 16 is provided with a feed or pressure line 11 which, in the embodiment under discussion has three branches or branch lines A, B and C, in which prevail different pressures of the pumped pressurized fluid medium, as governed by the related pressure regulating valves 17. These pressure regulating valves 17 receive control signals, by means of the control lines 18, from any suitable and thus not further shown control device.

The suction side 16c of the pump 16a is connected with a return flow line or conduit 20 equipped with a return flow pump 21. The return flow pump 21 removes the hydraulic medium from an intermediate space or chamber 22 between the stationary roll support 1 and the roll shell 2 by means of a suction connection or stud 23 or equivalent structure.

According to the invention a heat exchanger 24 is connected with the return flow line or conduit 20. The heat exchanger 24 connects the return flow line 20 in heat exchange relationship with the pressure line or pressure line means 11 and serves for the transmission of heat from the return flow line 20 to the pressure line 11.

As will be readily evident from the drawings, particularly the showing of FIG. 3, the heat exchanger 24 is constructed to operate according to the counterflow principle, i.e., the media of the return flow line 20 and the pressure line 11 flow in countercurrent or counterflow relationship with respect to one another through the heat exchanger 24.

As is further evident by referring to FIG. 3, a cooling device 25 is arranged after the heat exchanger 24 in the return flow line or conduit 20. This cooling device or cooler 25 is connected with a line or conduit 26 through which there is fed a suitable cooling agent. For temperature regulation purposes the cooling device 25 is provided with a bypass line 27 in which there is located a temperature regulating valve 28 equipped with a regulator 30. This regulator 30 is connected with a temperature measuring location 31 and controls the flow of the hydraulic medium through the bypass line 27 such that the pump 16a has infed thereto the medium at a certain set temperature.

Furthermore, as concerns the circulation system or path for the pressure or support elements 6, it will be observed that the branch lines A, B, C of the pressure line or conduit means 11 are provided with heating bodies or devices 32 which are activated by means of related temperature regulators 33. With the temperatures which come under consideration during operation of the system the heating devices 32 can be in the form of conventional bands which surround the related individual tubular lines or conduits and are equipped with electrical resistance heating elements.

As concerns the circulation system or fluid medium flow path for the heating elements 12, such is branched-off from the return flow line 20, following the return flow pump 21, by means of an overflow valve 34. The overflow valve 34 can be a spring-loaded valve which is arranged in a line or conduit 35 leading to a container or receptacle 26 for the hydraulic medium. The overflow valve 34 only infeeds to the container 36 the excess medium which is not sucked-up by the pump 16a.

Within the container 36 there is arranged a heating element or device 37 equipped with a temperature regulator 38 which, with the temperatures which come into consideration during system operation, likewise may be structured as an electrical resistance heating element.

As also seen by reverting to FIG. 3, the line or conduit means 13 leading to the heating devices 12 is likewise divided into three branches or branch lines A', B' and C' which are commonly fed by a pump 40. Connected at the individual branch lines of the line or conduit means 13 are the regulation valves 41, actuated by temperature sensors or feelers 42, and which sense the temperature of the roll shell 2 at the related locations. The temperature of the roll shell 2 is affected by the throughflow quantity of the oil serving for heating purposes.

In accordance with the modification shown in FIG. 5 dividing of the pressure line 11 into the branch lines A, B and C is first accomplished after i.e. downstream of the heat exchanger 24. In all other respects the operation of this hydraulic circuit is like that described in conjunction with FIG. 3.

Figure 4:
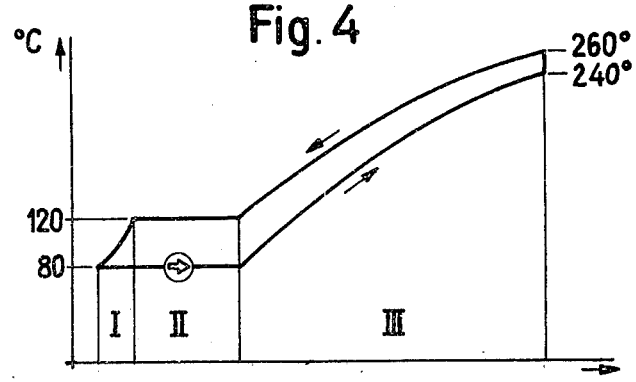
FIG. 4 is a temperature diagram of the circulation system coacting with the pressure or support elements and serving to explain the mode of operation of the invention.

FIG. 4 shows a diagram in order to explain the mode of operation of the controlled deflection roll arrangement designed according to the invention. This diagram illustrates the course of the temperature of the medium flowing in the circulation system for the pressure or support elements 6 upon leaving the controlled deflection roll until it again re-enters the controlled deflection roll.

Along the ordinate of the diagram or graph of FIG. 4 there has been plotted temperature and along the abscissa there has been plotted the individual sections or portions of the circulation system, and specifically, the section or portion III relates to the heat exchanger 24, the section II to the pump device 16a and section I to the cooler or cooling device 25. The indicated temperature values have only been given for one embodiment of the invention, and are not to be construed in any way as limiting the disclosure or the inventive concepts.

According to the diagram of FIG. 4 the hydraulic medium departs from the controlled deflection roll at a temperature of 260° C. and is cooled at the heat exchanger 24° to 120° C. Further cooling of the hydraulic medium from 120° C. to 80° C. is accomplished at the cooling device 25. In the pump 16a the oil at 80° C. is brought to the desired pressure, which can be in the order of about 50 bars and thereafter is brought to an outlet temperature of 240° C. in the heat exchanger 24. If necessary, by means of the heating elements 32 the temperature can be increased from 240° C. to 260° C.

However, in most instances, the heating of the oil for the controlled deflection roll exclusively by the heating element 37 is sufficient, i.e., by means of the heating circulation system for the heating devices 12. The oil is thus infed to the pressure or support elements 16 at the lower temperature of, in this case, about 240° C. and attains its temperature of 260° C. first after admixing with the heated oil emanating from the heating devices 12.

From the diagram of FIG. 4 there will be further seen how a combination of the heat exchanger 24 with the cooling device 25 renders possible, in economical fashion, operation of the pump 16a at low temperatures. According to the diagram of FIG. 4 it is sufficient for cooling of the oil to be accomplished in the cooling device 25 from 120° C. to 80° C. and its heating can be accomplished in the heating devices 32 or by admixing with the remaining oil in the controlled deflection roll, from 240° C. to 260° C. Without the benefit of the teachings of the invention the oil would have to be cooled from 260° C. to 80° C. and thereafter again heated from 80° C. to 260° C.

While there are shown and described present preferred embodiments of the invention, it is to be distinctly understood that the invention is not limited thereto, but may be otherwise variously embodied and practiced within the scope of the following claims. Accordingly,

What we claim is:

1. A heated controlled deflection roll comprising:
   a stationary support;
   a rotatable roll shell;
   means for mounting said rotatable roll shell to be rotatable about said stationary support;
   at least one pressure element for supporting the roll shell;
   a pump device;
   pressure line means for connecting the pump device with the pressure element for the infeed of a hydraulic pressurized fluid medium to the pressure element for supporting the roll shell;
   return flow line means for the fluid medium connected between the controlled deflection roll and said pump device;
   heat exchanger means for operatively connecting said return flow line means with said pressure line means and for transmitting heat from the return flow line means to the pressure line means; and
   cooler means arranged in the return flow line means after the heat exchanger means.

2. The controlled deflection roll as defined in claim 1, further including:
   temperature regulator means provided for said cooler means.

3. The controlled deflection roll as defined in claim 2, wherein:
   said heat exchanger means is structured to operate according to counterflow heat exchange principles.

4. The controlled deflection roll as defined in claim 2, further including:
   a heating device arranged after the heat exchanger means in said pressure line means.

5. The controlled deflection roll as defined in claim 1, wherein:
   said heat exchanger means is structured to operate according to counterflow heat exchange principles.

6. The controlled deflection roll as defined in claim 1, further including:
   a heating device arranged after the heat exchanger means in said pressure line means.

7. The controlled deflection roll as defined in claim 1, further including:
   heating means provided in said controlled deflection roll;
   container means for a hydraulic liquid which is infed to said heating means; and
   overflow valve means for connecting said return flow line means with said container means.

8. The controlled deflection roll as defined in claim 1, further including:
   a plurality of pressure elements provided for said controlled deflection roll and serving for the hydrostatic supporting and mounting of the roll shell.

9. The controlled deflection roll as defined in claim 8, wherein:
   said pressure elements each comprise a pistonlike support element.

10. The controlled deflection roll as defined in claim 8, wherein:
    said pressure elements each comprise a punchlike support element.

* * * * *